April 28, 1959     O. M. WAARA     2,884,278
GARDEN AND LAWN TOOL
Filed Aug. 30, 1955     2 Sheets-Sheet 2
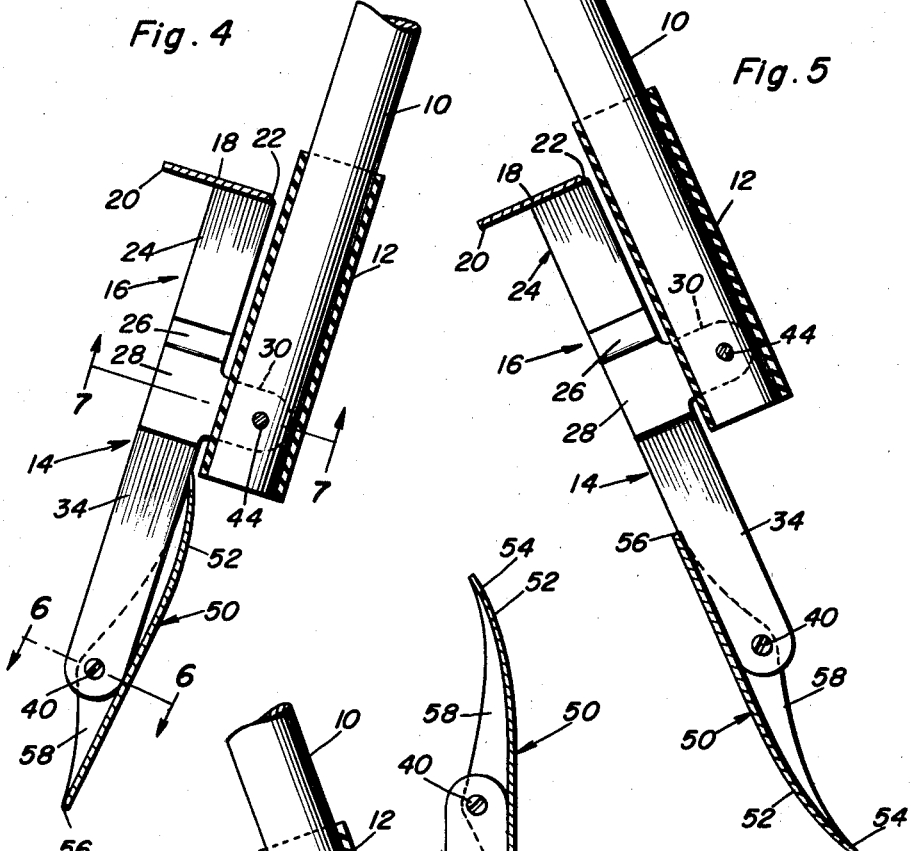
Otto M. Waara
INVENTOR.

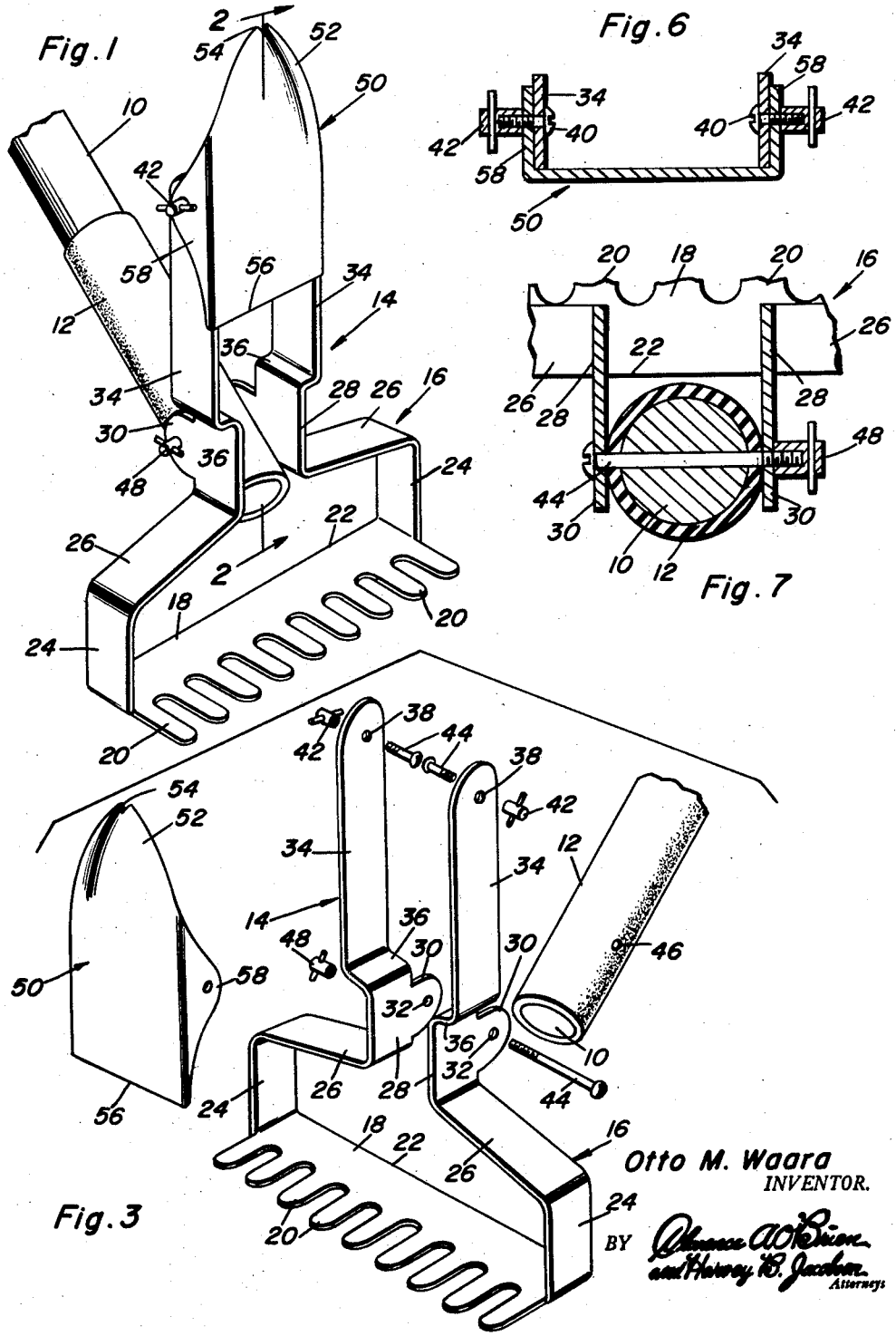

United States Patent Office 2,884,278
Patented Apr. 28, 1959

2,844,278

GARDEN AND LAWN TOOL

Otto M. Waara, Detroit, Mich.

Application August 30, 1955, Serial No. 531,398

2 Claims. (Cl. 294—51)

The present invention relates to a manually usable mechanical tool which is expressly designed and particularly constructed for gardening, generally speaking, and home lawn care.

Briefly, the preferred embodiment of the invention comprises a suitable long type handle having a hingedly mounted tool head on the outer or gardening end of the handle, said head being hingedly mounted on said outer end and swingable through a circular path from one to the other side of the handle and, in addition, having intermediate positions between these two extremes, said head being implemented with novel structural components which lend themselves to many and varied purposes and uses.

More specifically, the invention in its preferred embodiment is characterized by a tool head which is both detachably and hingedly mounted on said handle and which is implemented with toothed means and blade means, both broadly construed, and which, as before stated, is swingable from one to the other side of the handle so that both means may be situated in general coplanar relationship on one side of the handle in approximate parallelism to the handle with the toothed means up and against the handle and the blade means down and projecting beyond the outer end of the handle, or, alternatively, adjusted and fastened with the head swung to a diametrically opposite side of the handle with the blade means up and close to the handle and the toothed means down and projecting beyond the outer end of the handle and said head being also susceptible of being arranged and situated with the toothed means located to one side of the handle and the blade to the other side of the handle.

It will be obvious, therefore, that it is an object of the invention to structurally, functionally and otherwise improve upon similarly constructed and performing tools and implements and to provide one of the aforementioned construction which incorporates the necessary implements or means for cultivating, weeding, hoeing, thinning, crunching and also for raking or performing certain scraping and spade requirements for sodding, etc.

Other objects, features and advantages will become more readily apparent from the following description and the accompanying sheets of drawings.

In the drawings, wherein like numerals are employed to designate like parts throughout the views:

Figure 1 is a perspective view with the handle fragmentarily shown and with the novel tool head mounted thereon and with the significant implements or tool parts thereof in one of the many positions that can be assumed thereby;

Figure 2 is a view which is taken approximately on the plane of the line 2—2 of Figure 1;

Figure 3 is an exploded perspective view;

Figure 4 is a view in section and elevation somewhat similar to Figure 2 but showing how the tool head and components thereof may take a position substantially parallel to and on the left side of the handle;

Figure 5 is a view which is approximately like that identified as Figure 4, but with the blade means reversed; and Figures 6 and 7 are enlarged sections on the lines 6—6 and 7—7 of Figure 4.

Referring now to the drawings with the aid of reference numerals and lead lines, the handle is denoted by the numeral 10 and may be of wood or any suitable construction. It is preferably provided on its lower or so-called working end with an elastic or compressively resilient sleeve 12. The tool head, as a structural entity, is denoted by the numeral 14. The expression "head" is here used to comprehend the structural device depicted in the drawings and including the optionally and selectively usable means with which it is implemented for multiple purpose gardening and lawn duties. An essential component of the head is another part which is to be broadly treated as a specially bent metal band or strap which may be aptly described, it is believed, as a hingedly mounted swingable yoke. This is perhaps best shown in perspective in Figure 3, and it will be noted that the strap is bent upon itself to define a substantially rectangular frame 16 having a longitudinal frame member 18 one edge of which is formed with suitable rake teeth 20 to provide the aforementioned "toothed means." The opposite lengthwise edge of this member is sharpened by the cutting edge, as at 22. The end members of the frame are denoted at 24, and the components which go to make up the other lengthwise side members are denoted by the numerals 26, and these are slightly angled so that they may be said to be somewhat divergent. This side portion of the frame 16 is provided intermediate the ends of the frame with substantially spaced parallel coplanar extensions. These extensions are here described as arms, and the lateral bends 28 thereof are provided with outstanding ears 30 having bolt holes 32. The free end portions 34 of the arms are laterally offset by way of outstanding bends 36 and the extremities of these have bolt holes 38 to accommodate the complemental bolts 40 and nuts 42. The arms and ears straddle diametrically opposite sides of the sleeve covered handle and a bolt 44 passes through the bolt holes 32 and also through a bolt hole 46 in the handle. This is provided with what may be described as a thumb nut 48, and therefore, the head or yoke is detachably or hingedly mounted on the handle so that it may be swung from what may be called the right side to the left side, as shown in Figures 1, 2, 4 and 5, respectively, and also, under certain conditions, not generally favorable, the head or yoke may be positioned in an intermediate place between these two extremes provided that the bolt and nut means 44 and 48 will hold. That is to say that certain light duty intermediate positions of the head may be utilized. In any event, this yoke serves to provide a hoe and a rake and such other purposes as will be clarified and it also provides the mounting for the blade means which is generally denoted by the numeral 50. This is a sheet metal scoop-shaped structure which is primarly thought of as a spade, and it is elongated and has one end portion dished to form a sort of a bowl portion, as at 52. This end portion tapers or narrows gradually to a terminal point which is bifurcated, as at 54, to provide a fork. The other end portion 56 is transverse to the lengthwise dimensions and is preferably straight across. The longitudinal side is provided with outstanding flanges 58 and these overlap the free end portions of the arms and are attached thereto by way of the aforementioned bolts 40 and their accompanying wing nuts 42. Thus, the blade means or spade is adjustably and detachably mounted. It may be reversed to assume either the position shown at the left in Figure 4 or at the right in Figure 5.

It will be evident that this implemented hingedly mounted head has implements or components which are such that they provide means to hoe, weed, cultivate, trim, cut sod, scrape, trench, etc. To use the spade, the tool is turned on the handle so that the frame member 18 actually touches or is close to and braced by the handle. The pointed end of the spade is used for weeding lawns, furrowing, trenching and planting. The spade may be turned by loosening the wing nut to bring the square end into position for spading and trimming edges of lawns, etc.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An implement for garden and lawn care comprising a handle, a yoke having opposed arms, median portions of said arms having ears that are parallel to each other and offset in a direction at right angles to the longitudinal axis of said yoke, said ears straddling and being pivotally mounted on an end of said handle, and a tool at each end of said yoke, said tools extendible alternately beyond the end of said handle.

2. An implement for garden and lawn care comprising a handle, a compressible resilient sleeve mounted on an end portion of said handle and providing a yielding ferrule, a yoke having spaced parallel ears midway of its ends, said ears offset in a direction at right angles to the longitudinal axis of said yoke and straddling diametrically opposite side portions of said sleeve, an attaching and pivoting bolt passing through said ears, sleeve and handle-end, said yoke having a tool at each end thereof extendible alternately beyond the end of the handle.

References Cited in the file of this patent

UNITED STATES PATENTS

| | | |
|---|---|---|
| 39,012 | Goodrem | June 23, 1863 |
| 50,305 | Porter et al. | Oct. 3, 1865 |
| 1,032,376 | Boivin | July 16, 1912 |
| 1,245,812 | Smock | Nov. 6, 1917 |
| 1,504,913 | Simoncelli | Aug. 12, 1924 |
| 2,250,075 | Werb | July 22, 1941 |
| 2,796,011 | Schmidt | June 18, 1957 |